United States Patent
Bridges et al.

(10) Patent No.: US 7,093,100 B2
(45) Date of Patent: Aug. 15, 2006

(54) TRANSLATION LOOK ASIDE BUFFER (TLB) WITH INCREASED TRANSLATIONAL CAPACITY FOR MULTI-THREADED COMPUTER PROCESSES

(75) Inventors: Jeffrey Todd Bridges, Raleigh, NC (US); Les M. DeBruyne, Cary, NC (US); Robert L. Goldiez, Apex, NC (US); Michael S. McIlvaine, Wake Forest, NC (US); Thomas A. Sartorius, Raleigh, NC (US); Rodney Wayne Smith, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 319 days.

(21) Appl. No.: 10/714,282

(22) Filed: Nov. 14, 2003

(65) Prior Publication Data
US 2005/0108497 A1   May 19, 2005

(51) Int. Cl.
*G06F 12/08* (2006.01)
(52) U.S. Cl. ...................................... 711/207; 711/206
(58) Field of Classification Search ..................... None
See application file for complete search history.

(56) References Cited

U.S. PATENT DOCUMENTS

| | | | |
|---|---|---|---|
| 4,136,385 A | | 1/1979 | Gannon et al. |
| 4,797,814 A | | 1/1989 | Brenza |
| 4,802,084 A | * | 1/1989 | Ikegaya et al. ................. 711/6 |
| 4,985,828 A | | 1/1991 | Shimizu et al. |
| 5,437,016 A | | 7/1995 | Ikegaya et al. |
| 5,630,087 A | | 5/1997 | Talluri et al. |
| 5,754,818 A | | 5/1998 | Mohamed |
| 6,018,759 A | * | 1/2000 | Doing et al. ................. 718/108 |
| 6,134,699 A | * | 10/2000 | Steenburgh et al. ........ 714/803 |
| 6,233,599 B1 | * | 5/2001 | Nation et al. ................ 718/102 |
| RE37,305 E | * | 7/2001 | Chang et al. ................ 711/207 |
| 6,298,411 B1 | | 10/2001 | Giacalone |
| 6,308,247 B1 | * | 10/2001 | Ackerman et al. ........... 711/206 |
| 6,438,671 B1 | * | 8/2002 | Doing et al. ................. 711/173 |
| 6,446,188 B1 | * | 9/2002 | Henderson et al. ......... 711/206 |
| 6,633,967 B1 | * | 10/2003 | Duncan ....................... 711/207 |
| 6,829,684 B1 | * | 12/2004 | Doing et al. ................. 711/152 |
| 6,963,964 B1 | * | 11/2005 | Luick ........................... 711/210 |
| 2005/0022192 A1 | * | 1/2005 | Kim ............................. 718/100 |
| 2005/0027963 A1 | * | 2/2005 | Hum et al. ................... 711/210 |
| 2005/0251613 A1 | * | 11/2005 | Kissell .......................... 711/1 |

FOREIGN PATENT DOCUMENTS

JP   2001-51856   2/2001

* cited by examiner

*Primary Examiner*—Gary Portka
*Assistant Examiner*—Kaushik Patel
(74) *Attorney, Agent, or Firm*—Joscelyn G. Cockburn; Connolly Bove Lodge & Hutz, LLP

(57) ABSTRACT

Method and apparatus for increasing the number of real memory addresses accessible through a translational look-aside buffer (TLB) by a multi thread CPU. The buffer entries include a virtual address, a real address and a special mode bit indicating whether the address represents one of a plurality of threads being processed by the CPU. If the special mode bit is set, the real address associated with the virtual address higher order bits are concatenated with the thread identification number being processed to obtain a real address. Buffer entries containing no special mode bit, or special mode bit set to 0, are processed by using the full length of the real address associated with the virtual address stored in the look-aside buffer (TLB).

17 Claims, 3 Drawing Sheets

TRANSLATION LOOK ASIDE BUFFER (TLB) WITH INCREASED TRANSLATIONAL CAPACITY FOR MULTI-THREADED COMPUTER PROCESSES

BACKGROUND OF THE INVENTION

The present invention relates to digital computer systems which provide multi-threaded execution. Specifically, a translation look-aside buffer (TLB) is provided which reduces the number of entries in the main memory required to service a multi-threaded computer system.

In order to increase the overall speed of computer program execution, multi-threaded computer processing units execute a plurality of threads associated with the program at one time. The execution of the program is divided into multiple threads which are active at the same time, and various hardware resources of the processor can simultaneously execute the active threads. Simultaneous processing of multiple independent instruction streams keeps the processors computational hardware resources active. Improved execution efficiency results and normal pipe-line stalls that may occur with a single threaded processor which are precipitated by instruction dependencies can be avoided with multi-threaded computer processors.

High performance multi-threaded processors have instructions from multiple threads which are in progress at the same time in different parts of the execution pipe line. Each of the threads is identified as a context and is allocated physical storage elements to hold the state associated with the thread. In any one instance, there is a physical register to hold an executing thread's architectural context. In this way, the various processes being executed are tagged with a thread ID, so that the computing results associated with each thread context can be applied to the correct architectural resources in the multi-threaded system.

In both single threaded processors and multi-threaded processors, memory management is necessary so that the program can retrieve values stored in a memory relatively quickly. A common technique used in memory management employs a look-aside buffer (TLB) which caches address translation key pairs. The TLB is generally a content addressable memory (CAM) having a virtual address as its look-up key. Program execution identifies a virtual address which is translated by the look-aside buffer (TLB) to obtain a real address of a memory location of a value needed for the program thread execution.

Entries in the translational look-aside buffer (TLB) are generally organized so that a virtual page number identified from code execution identifies a real page number stored within the memory. The TLB identifies from a virtual page number a group of pages, starting at a location identified by the virtual page number (VPN). The location within the group of pages is identified by the lower order bits of the virtual page number to save space in the look-aside buffer (TLB). This is important, in that the translational look-aside buffer (TLB) is a hardware table with a fixed capacity and if the CPU uses more pages of memory than the number of TLB mapping cache entries, the TLB will have to be updated from an external memory. The process of accessing the external memory and obtaining updates slows down the memory management process, and thus the overall relative speed of execution. With many threads running on the CPU nearly simultaneously, each of the active threads must keep a set of active mappings in the translational look-aside buffer (TLB) to avoid any significant penalty from fetching the mappings that are not resident in the TLB. Unfortunately, increasing the number of entries in the translational look-aside buffer (TLB) increases the required chip area and increases the access time and power consumption of the translational look-aside buffer (TLB).

It is therefore desirable to organize the contents of the translational look-up buffer (TLB) to reduce the need for frequent updates of the stored information without increasing the total number of memory locations available for translational data.

SUMMARY OF THE INVENTION

A method and apparatus for increasing the number of real memory addresses accessible through a translation look-aside buffer (TLB) is provided. Each entry in the TLB includes a virtual address, a real address of a memory location and a special thread implicit mode bit to indicate whether the virtual address represents one of a plurality of threads being processed. When a virtual address in the buffer corresponds to a virtual address sought during processing by the CPU, the real address is read from the buffer entry corresponding to the virtual address. When the special mode bit is set to indicate that one of a plurality of threads is being processed by the CPU, the CPU concatenates with the higher order bits of the real address a value representing a thread being processed. In the event that the special mode bit is not set, meaning that the buffer entry represents a conventional translation look-aside buffer entry, the entire real address including its lower order bits is used to identify a memory storage area to acquire data for the processor. The real address may be further concatenated with the lower order bits of the virtual address to provide additional granularity to the real address.

The invention is particularly useful in multi-thread CPU processing. By using the thread identification as part of the real address, a single translation look-aside buffer (TLB) entry can be used to identify multiple addresses corresponding to the number of threads being processed. The invention can co-exist simultaneously with conventional translational look-aside buffer entries by setting the thread implicit mode bit to zero. When this happens, virtual addresses are mapped to real addresses which are unique to a single virtual address.

DESCRIPTION OF THE PREFERRED EMBODIMENT

Figure 1:
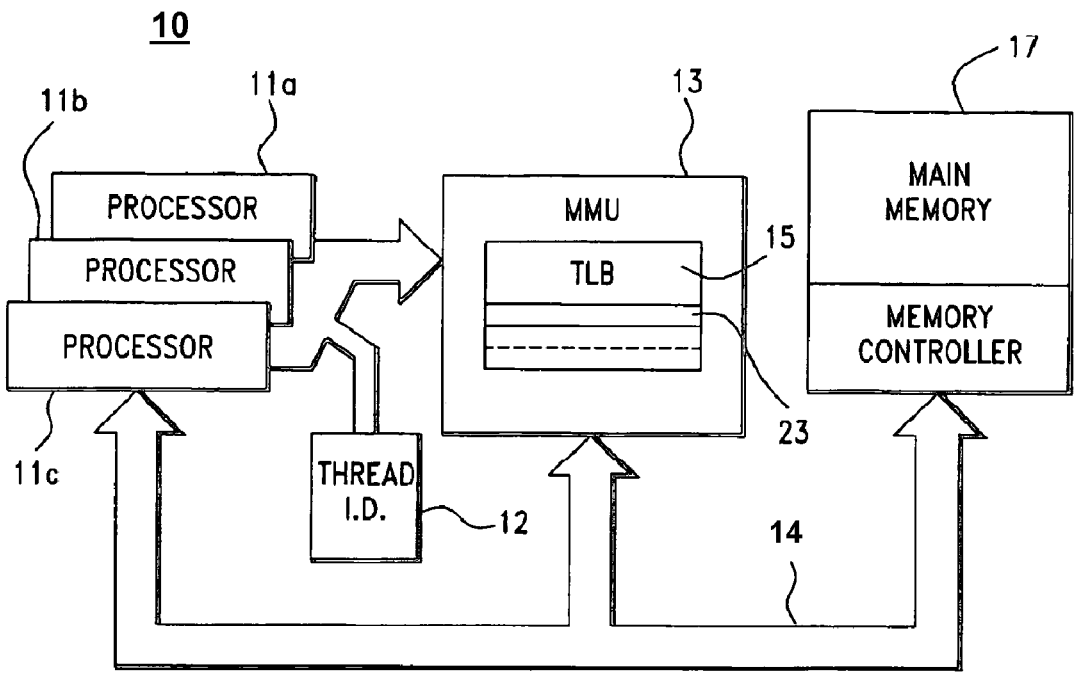
FIG. 1 shows a multi-thread processor (CPU) and a memory management unit employing a look-aside buffer (TLB)

Referring now to FIG. 1, a block diagram representation of a multi-thread processor is shown with an accompanying translational look-side buffer (TLB) in accordance with a preferred embodiment of the invention. The multi-thread CPU computing system 10 is illustrated as multiple processors 11A–11N, representing N threads of a multi-thread CPU. Each of the threads 11A–11N execute in a pipeline processor. During simultaneous execution of the various threads, access to a main memory 17 may be required to complete executing an instruction.

The access to the main memory 17 is through a memory management unit 13. Associated with the memory management unit 13 is a translational look-aside buffer (TLB) 15. The process of retrieving and writing data to the memory 17 through bus 14 is aided with the memory management unit 13 translational look-up buffer (TLB) 15. There is one instance of physical registers to hold each of the executing threads architectural contexts. For each thread, that may be simultaneously executed, there is a copy of the General Purpose Registers (GPRs), the Link Register (LR), the Count Register (CTR), the Fixed Point Exception Register (XER), and the Condition Register (CR). Each thread being processed is allocated some dedicated physical storage elements in the main memory 17 to hold the state associated with the thread represented by the contents of the architecturally defined registers. Each instruction that is in the CPU pipeline is tagged with a thread ID so that the architectural results that it produces can be applied to the correct thread's architectural resources. Thread ID register 12 maintains the thread identification ID so that the result of execution can be identified with a particular thread.

The memory management unit 13 operates from addresses which are visible to the programmer, referred to as the effective address (EA). The effective address (EA) is related to the real address (RA) in main memory through a translational look-aside buffer (TLB) 15. Multiple instances of a program may be running in a time slice manner, and each program instance can appear to the programmer to use the same memory addresses, but refer to different physical storage locations using the mapping of translational look-aside buffer (TLB) 15.

In one implementation of a translational look-aside buffer 15, the effective address (EA) is used with a process identifier (PID) which is unique for each process instance. A virtual address (VA) is formed by the concatenation of the effective address (EA) and the process identifier (PID). Together, these entities constitute a one-to-one mapping between a virtual address and a corresponding real address in main memory 17.

Figure 2:
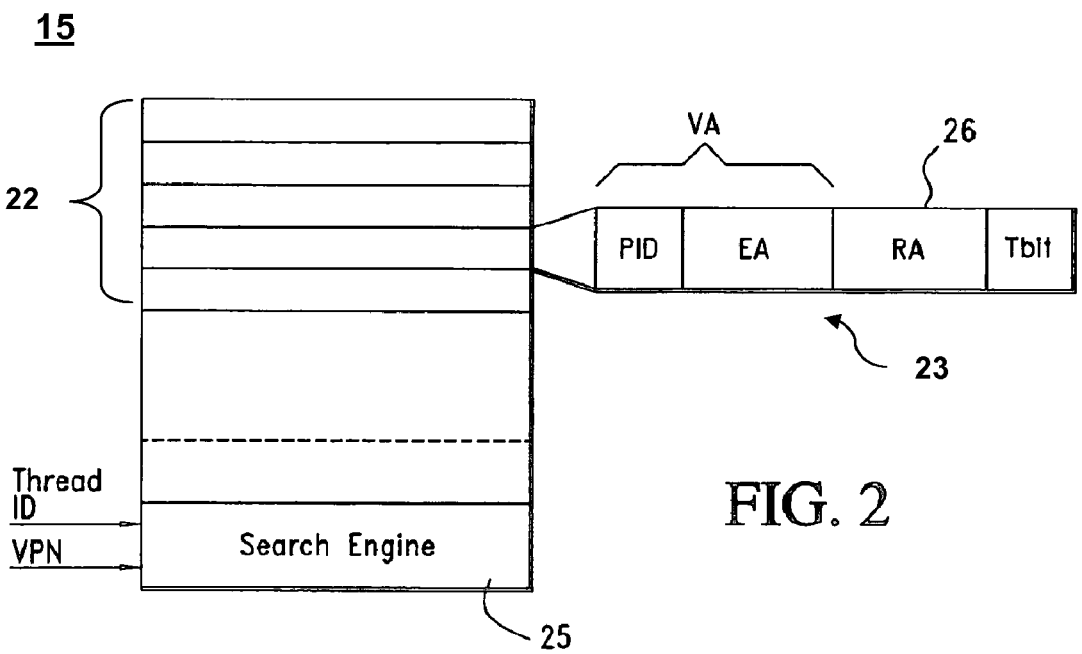
FIG. 2 represents the components of a look-aside buffer (TLB)

The organization of the translational look-aside buffer (TLB) 15 in accordance with a preferred embodiment is illustrated more particularly with respect to FIG. 2. The process identifier (PID) and effective address (EA) are stored as a virtual address along with a real address 26 for main memory 17 in a content addressable memory 22. The virtual address comprising process identifier (PID) and the effective address (EA) are used as the look-up keys. The translational look-aside buffer 15 includes a search engine 25 which uses a portion of the virtual address comprising the process identifier (PID) and the higher order bits of the effective address (EA) to locate a particular real address (RA) stored in a location 23. FIG. 2, unlike the conventional translational look-up buffer architecture, includes a thread, implicit identifier bit (Tbit). The Tbit is used to identify whether or not the entry 23 in the TLB is associated with one of the multiple threads 11A–11N being executed.

Figure 3:
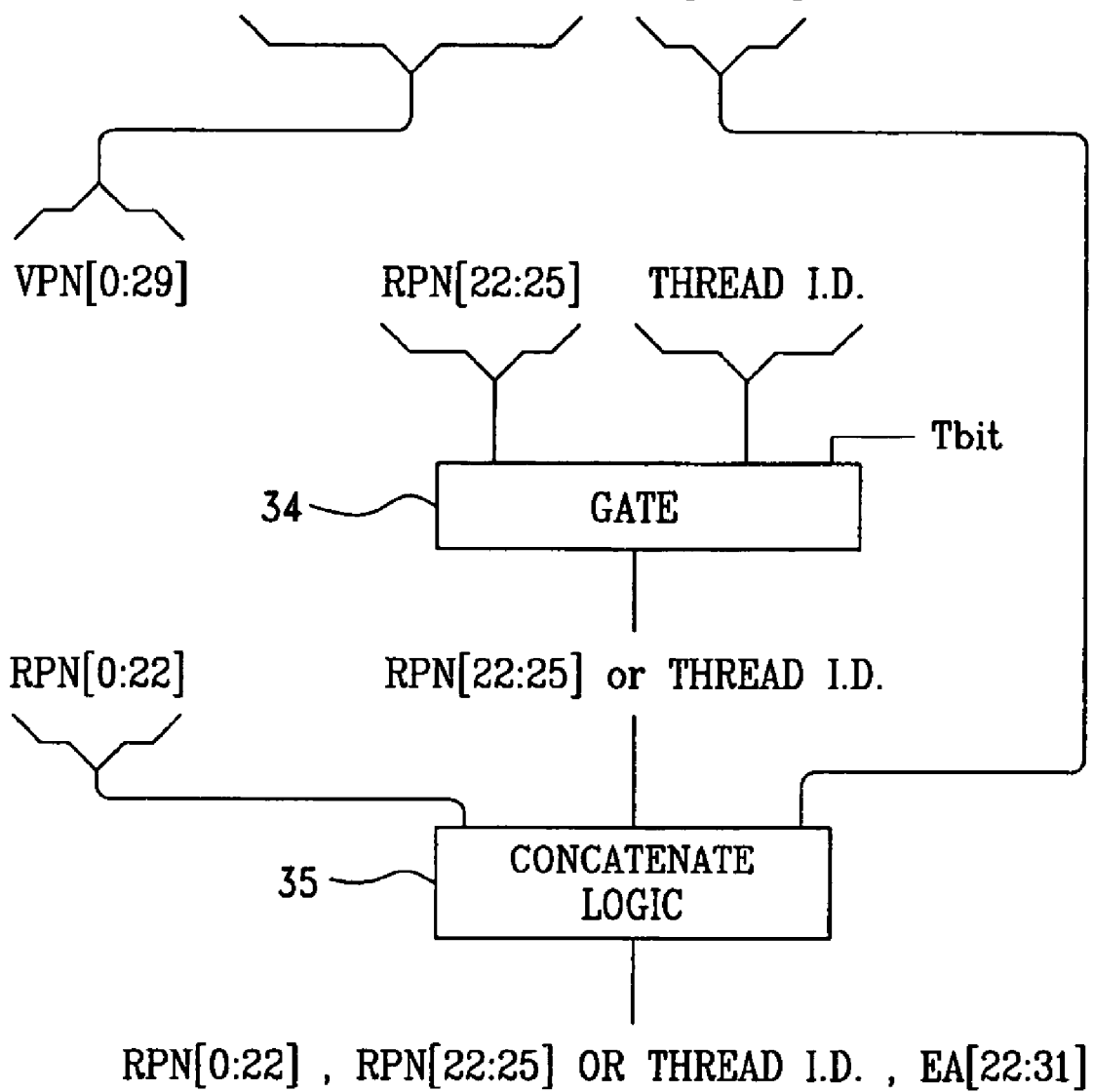
FIG. 3 represents the decoding of a virtual address into a real address in accordance with a preferred embodiment of the invention.

The search engine 25 may be employed to derive a real address for the main memory 17 using a virtual page number (VPN) derived from the virtual address (VA) and the thread ID identifying the thread for which access to the main memory is being made. FIG. 3 illustrates how the translational look-aside buffer (TLB) entry 23 can be decoded to represent a plurality of real addresses for memory 17.

The virtual address (VA) which is called for by the executing thread has bits 0–39 which comprise (as shown in FIG. 3) the process identification number (PID 0:7)bits the higher order bits of the effective address (EA 0:21) bits, and the lower order (LA 22:31) bits. In accordance with the present embodiment of the invention, the virtual page number (VPN) comprises the process identification number (PD 0;7) and the higher order bits of the effective address (EA 0:21). Using the VPN (0:29), the real page number (RPN), representing the higher order bits of the real address RA (0:22) are located in the memory location 23.

The remaining portion of the real address of a storage location in main memory 17 is either the lower order bits of the real address RPN (22–25) or the thread ID. As shown in FIG. 3, gate 34 under control of the value of the thread implicit mode bit (Tbit) selects either the thread ID from register 12 or the lower order bits of the real address RPN (22:25). A second logic circuit in the buffer hardware 35 concatenates the result obtained from gate 34 with the lower order bits of the effective address EA (22:31). When the thread implicit mode bit (Tbit) is set to one, the real address for the location in main memory 17 comprises RPN (0:22), the thread ID, and the lower order bits of the effective address EA (22:31). In the event that the thread implicit mode bit has not been set, the gate 34 inserts the real address lower order bits of the real address RPN (22:25) instead of the thread ID (0:2 in the case of an 8 bit thread ID).

Thus, the same virtual address may be used to identify a group of pages, wherein the particular page within the group is identified by either the lower order bits of the real address or the thread ID.

The advantage of the foregoing is that the translational look-aside buffer can be used to store both virtual addresses including the thread implicit bit for addresses related to a thread of a multi thread processor, or to store a virtual address which relates to a single thread processing system.

Figure 4:
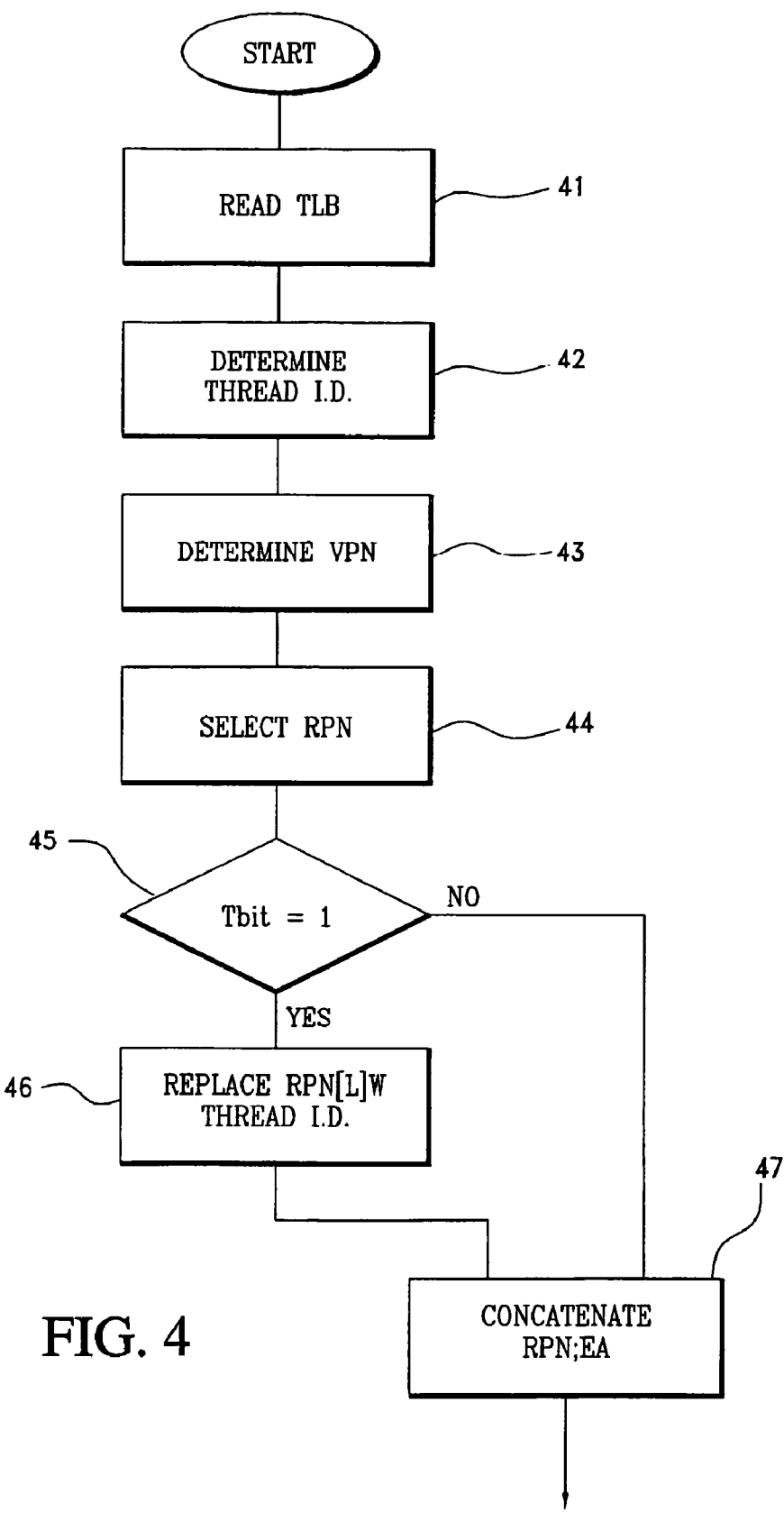
FIG. 4 illustrates in flowchart form the process executed by the translational look-aside buffer (TLB) in accordance with a preferred embodiment.

The foregoing apparatus for storing and utilizing translational look-aside buffer (TLB) entries which include a thread implicit (TI) bit carries out the process shown in FIG. 4. Referring now to FIG. 4, the process of reading data from the translational look-aside buffer (TLB) begins in step 41. The process requires a determination of a thread ID associated with a particular virtual address being requested by the processor. The virtual address (VA) includes an effective address (EA) and a process identifier (PID). In a multi thread processor such as shown in FIG. 1, a thread ID will be available from the thread ID register 12.

The hardware engine 25 of the translational look-aside buffer (TLB) determines the VPN in step 43, representing the process identifier PID (0:7) and the first 22 bits of the effective address EA (0:21) requested by the process being executed in the CPU pipeline processor.

Once the VPN is known, the real address associated with the VPN comprising both higher order RPN (0:22) and lower order real address bits RPN (22:25) stored with the virtual page number (VPN) are determined in step 44. The determination is made in decision block 45 as to whether or not the thread implicit mode bit Tbit has been set. If the bit has been set, indicating that the address sought is particular to a specific thread ID, process step 46 replaces the lower order real address bits RPN (22:25) with the thread ID in step 46 by concatenating the thread ID with the higher order real address bits RPN (0:22). As a final step, the real address is concatenated in step 47 with the lower order bits of the effective address EA (22:31).

If decision block 45 determines that the thread implicit bit is not set to 1, representing a conventional look-aside buffer entry, then the translational look-aside buffer (TLB) contents are processed by using all of the real address data bits concatenated with the effective address (EA) lower order data bits in step 47.

The foregoing description of the invention illustrates and describes the present invention. Additionally, the disclosure shows and describes only the preferred embodiments of the invention in the context of a translation look aside buffer (TLB) with increased translational capacity for multi-threaded computer processes, but, as mentioned above, it is to be understood that the invention is capable of use in various other combinations, modifications, and environments and is capable of changes or modifications within the scope of the inventive concept as expressed herein, commensurate with the above teachings and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form or application disclosed herein. Also, it is intended that the appended claims be construed to include alternative embodiments.

What is claimed is:

1. A method for increasing the number of real memory addresses accessible through a translation look aside buffer (TLB) by a multi thread CPU comprising:
   storing in said buffer entries including a virtual address, a real address and a special mode bit indicating whether said virtual address represents one of a plurality of threads being processed;
   concatenating to higher order bits of said real address a value representing a thread being processed when said buffer entries are read by a processor in which said special mode bit indicates that said one of a plurality of threads is being processed; and
   concatenating to said real address the lower order bits of said real address when said special mode bit indicates a thread is not being processed.

2. The method according to claim 1 wherein said virtual address defines a plurality of pages in a memory, and said value representing said thread identifies a page within said plurality of pages when said special mode bit is set.

3. The method according to claim 1 wherein said virtual address comprises an effective address and a process identifier unique to each process requiring data located at said real address.

4. The method according to claim 1 wherein said lower order bits of said concatenated real address identify a page in a group of pages stored in a memory.

5. The method according to claim 1 wherein said real address stored in said buffer constitutes the higher order bits of an address in said real memory.

6. A method for increasing the number of real memory addresses accessible through a translation look aside buffer (TLB) by a multi thread CPU comprising:
   storing in said buffer entries including a virtual address, a real address and a special mode bit indicating whether said virtual address represents one of a plurality of threads being processed;
   concatenating to higher order bits of said real address a value representing a thread being processed when said buffer entries are read by a processor in which said special mode bit indicates that said one of a plurality of threads is being processed;
   concatenating to said real address the lower order bits of said real address when said special mode bit indicates that no thread is being processed; and
   further concatenating a portion of said virtual address to said concatenated real address.

7. The method for increasing the number of real memory addresses accessible through a translation look aside buffer according to claim 6 wherein said virtual address comprises an effective address and a process identification number.

8. The method for increasing the number of real memory addresses accessible through a translation look aside buffer according to claim 7 wherein said portion of said virtual address which is concatenated with said real address includes the lower order bits of said effective address.

9. A translation look aside buffer for identifying real addresses of data stored in a memory for a plurality of threads being executed by a multi-thread CPU comprising:
   an array of storage elements which caches address translation key value pairs;
   a search engine for searching said translation key pairs to locate a real address of a group of pages stored in memory which are identified by a virtual page address, and a thread implicit mode bit associated with said virtual address;
   a first logic circuit connected to receive said thread implicit bit; and concatenating with said real address of said group of pages data bits representing a thread being processed by said multithread CPU when said thread implicit bit is set to a first value.

10. The translation look aside buffer according to claim 9 wherein said logic circuit concatenates lower order bits derived from said real address to said address of said group of pages when said thread implicit bit is set to a second value.

11. The translation look aside buffer according to claim 10 wherein said real address bits are further concatenated with the lower order bits of said virtual address.

12. The translation look aside buffer according to claim 9 wherein said virtual address is derived from a process number and an effective address provided by said CPU.

13. The translation look aside buffer according to claim 9 further comprising a register for providing said bits which identify a thread number.

14. A translation look aside buffer for identifying real addresses of data stored in a memory for a plurality of threads being executed by a multi-thread CPU comprising:
   an array of storage elements which caches address translation key value pairs;
   a search engine for searching said array of memory elements to locate a real address of a group of pages stored in memory which are identified by a virtual page address, and a thread implicit mode bit associated with said virtual address;
   a first logic circuit connected to receive said thread implicit bit; and concatenating with higher order bits of said real address of said group of pages data bits representing a thread being processed by said multi-thread CPU when said thread implicit bit is set to a first value, and concatenating with said higher order bits of said real address of said group of pages lower order bits of said real address when said thread implicit bit is set to a second value; and
   a second logic circuit for concatenating to an address produced by said first logic circuit a portion of said virtual page address.

15. The translation look aside buffer for identifying real addresses of data stored in a memory according to claim 14 wherein said virtual page address includes an effective address, and said portion of said virtual page address which is concatenated with the address produced by said first logic circuit are the lower order bits of said effective address.

16. The translation look aside buffer for identifying real addresses of data stored in said memory of claim 14 wherein said virtual page address includes a process identification number and an effective address.

17. The translation look aside buffer for identifying real addresses of data stored in said memory of claim 16 wherein said second logic circuit concatenates the lower order bits of said effective address with the address produced by said first logic circuit.

\* \* \* \* \*